United States Patent [19]
Mochida et al.

[11] Patent Number: 5,317,747
[45] Date of Patent: May 31, 1994

[54] MULTIPROCESSOR SYSTEM AND INTERRUPTION CONTROL DEVICE FOR CONTROLLING INTERRUPTION REQUESTS BETWEEN PROCESSORS AND PERIPHERAL DEVICES IN THE MULTIPROCESSOR SYSTEM

[75] Inventors: Tetsuya Mochida, Yokohama; Kouichi Okazawa, Tokyo; Kouichi Kimura; Hitoshi Kawaguchi, both of Yokohama; Kazushi Kobayashi, Ebina, all of Japan

[73] Assignee: Hitachi, Ltd, Tokyo, Japan

[21] Appl. No.: 666,066

[22] Filed: Mar. 7, 1991

[30] Foreign Application Priority Data

Mar. 8, 1990 [JP] Japan ................... 2-57424
Mar. 20, 1990 [JP] Japan ................... 2-70866

[51] Int. Cl.⁵ .............. G06F 9/46; G06F 13/24; G06F 15/16
[52] U.S. Cl. ................... 395/725; 364/230; 364/230.2; 364/228.3; 364/240; 364/240.2; 364/247; 364/DIG. 1
[58] Field of Search ... 364/200 MS File, 900 MS File; 395/275, 725, 325, 775; 340/825.52; 370/85.1

[56] References Cited

U.S. PATENT DOCUMENTS

| | | | |
|---|---|---|---|
| 3,676,861 | 7/1972 | Ruth | 364/200 |
| 3,829,839 | 8/1974 | Jeane | 364/200 |
| 3,999,165 | 12/1976 | Kita et al. | 364/200 |
| 4,172,284 | 10/1979 | Heinrich et al. | 364/200 |
| 4,271,468 | 6/1981 | Christensen et al. | 364/200 |
| 4,279,016 | 7/1981 | Leininger et al. | 364/200 |
| 4,420,806 | 12/1983 | Johnson, Jr. et al. | 364/200 |
| 4,495,569 | 1/1985 | Kagawa | 364/200 |
| 4,779,195 | 10/1988 | James | 364/200 |
| 4,930,070 | 5/1990 | Yonekura et al. | 364/200 |
| 4,953,072 | 8/1990 | Williams | 364/200 |
| 4,989,113 | 1/1991 | Hull, Jr. et al. | 364/200 |
| 4,991,084 | 2/1991 | Rodiger et al. | 364/200 |
| 5,115,506 | 5/1992 | Cohen et al. | 395/725 |
| 5,125,093 | 6/1992 | McFarland | 395/725 |

*Primary Examiner*—Gopal C. Ray
*Attorney, Agent, or Firm*—Antonelli, Terry, Stout & Kraus

[57] ABSTRACT

An interruption control device for controlling interruption requests in a multiprocessor system having a plurality of processor elements and a plurality of peripheral devices. The interruption control device is connected between the processor elements and the peripheral devices. The interruption control device includes a plurality of interruption request registers for indicating the occurrence of an interruption request from either a processor element or a peripheral device to a processor element and a plurality of interruption enable registers for authorizing an interruption request of a processor element. The interruption request registers are read by the processor element being interrupted to identify the source of the interruption request.

17 Claims, 8 Drawing Sheets

MULTIPROCESSOR SYSTEM AND INTERRUPTION CONTROL DEVICE FOR CONTROLLING INTERRUPTION REQUESTS BETWEEN PROCESSORS AND PERIPHERAL DEVICES IN THE MULTIPROCESSOR SYSTEM

CROSS REFERENCE TO RELATED APPLICATION

This application is related to copending application Ser. No. 512,810, filed Apr. 20, 1990, the subject matter of which is incorporated by reference herein.

BACKGROUND OF THE INVENTION

The present invention relates to apparatus for controlling interruption requests in processor systems. More particularly, the present invention relates to an interruption control device for controlling interruption requests in a multiprocessor system having a plurality of interconnected processor elements.

As is well known in the art an interruption request is a computer instruction that instructs the processor of the computer to halt execution of a currently executing program and perform some other more important task associated with the device requesting the interruption. Typically, an interruption request is caused in a conventional processor system by a peripheral device such as an input/output (I/0) device actuating an interruption request line connected between the conventional processor system and the peripheral device.

In the conventional processor system a plurality of interruption request lines are provided so that a plurality of different interruptions may be caused by a plurality of different peripheral devices. The particular task performed by the conventional processor system is determined by the particular interruption request line being actuated. The identification of the source of an interruption request is made easy in the conventional processor system by simply identifying the interruption request line being actuated. As described above an interruption request line is connected between the conventional processor system and each peripheral device.

Identifying a particular task corresponding to a particular interruption request and the peripheral device or processor which caused the interruption request is more complicated in a multiprocessor system. A multiprocessor system includes a plurality of interconnected processor elements and a plurality of peripheral devices each connected to one or more of the processor elements. Each of the processor elements and each of the peripheral devices may cause an interruption request in at least one of the processor elements.

A simple way to accomplish the identification of the particular interruption request to be performed and the peripheral device or processor element causing the interruption request in a multiprocessor system is to electrically connect an interruption request line between each peripheral device and each processor element of the multiprocessor system. This arrangement permits each peripheral device or processor element to initiate an interruption request in any one of the processor elements of the multiprocessor system.

Although the above-described apparatus permits each processor element to receive an interruption request from any one of the peripheral devices or any one of the other processor elements, the apparatus suffers from the disadvantage of having numerous interconnecting wires between the processor elements of the multiprocessor system and the peripheral devices. Such an arrangement becomes extremely cumbersome as the multiprocessor system grows in size by the addition of new processor elements and peripheral devices.

Apparatus has been proposed for reducing the number of interruption request lines in the above-described arrangement in Japanese Application No. 163948/88. The apparatus as disclosed in Japanese Application No. 163948/88 provides a single interruption request line connected to all of the processor elements of the multiprocessor system. The single interruption request line designates a processor element to which an interrupt is to be requested by addressing and storing information in a specific memory space of the memory of the processor element to be interrupted. In accordance with the apparatus described in Japanese Application No. 163948/88 a device, connected between each of the I/O devices or processor elements and the single interruption request line, is provided for performing the addressing and storing operation described above.

Thus, in the apparatus disclosed by Japanese Application No. 163948/88, when an interruption request is generated by one of the I/O devices an address is simultaneously output by the device to the memory of one of the processor elements of the multiprocessor system corresponding to the interruption request via the single interruption request line. The address generated by the device addresses a particular memory space in the memory of the processor element corresponding to the requested interruption.

Although the above-described apparatus disclosed in Japanese Application No. 163948/88 reduces the number of interruption request lines connected between the processor elements of the multiprocessor system and the peripheral devices, the apparatus disclosed by Japanese Application No. 163948/88 suffers from the disadvantage of reducing the throughput of interruption requests between the processor elements of the multiprocessor system and the peripheral devices. In the apparatus disclosed by Japanese Application No. 163948/88 only one interruption request at a time can be handled by the device being that an address must be generated which is output on the single interruption request line connected to each of the processor elements of the multiprocessor system.

Therefore, based on the above, there is not provided a conventional system for generating an interruption request that reduces the amount of hardware needed to implement effective interruption control where a particular interruption request and the source of interruption request is identified to a processor element in a multiprocessor system.

Further, there is not provided a conventional system which does not limit the throughput of interruption requests to different processor elements in a multiprocessor system thereby permitting the efficient control of simultaneous and sequential interruption requests.

SUMMARY OF THE INVENTION

It is an object of the present invention to provide an interruption control device for operation with a multiprocessor system having a plurality of processor elements that reduces the amount of hardware needed to effectively control interruption requests directed to the processor elements wherein the interruption requests are initiated by a plurality of peripheral devices or the processor elements themselves.

It is another object of the present invention to provide an interruption control device for use in a multiprocessor system having a plurality of processor elements for efficiently controlling simultaneous and sequential interruption requests generated by a plurality of peripheral devices or the processor elements themselves.

It is yet another object of the present invention to provide an interruption control device for operation with a multiprocessor system having a plurality of processor elements for identifying the particular interruption request and the source of the interruption request.

In order to accomplish the above objects the present invention provides first, second and third embodiments of the present invention.

The first embodiment of the present invention provides an interruption control device which operates in a multiprocessor system having a plurality of interconnected processor elements wherein the interruption control device is connected to each of the processor elements by interruption request lines. The first embodiment of the present invention provides for the control of interruption requests between processor elements.

The interruption control device of the first embodiment of the present invention includes a interruption control register having a plurality of interruption request registers corresponding to the plurality of processor elements. Each of the interruption request registers is at least capable of permitting read access from a corresponding processor element and permitting write access from at least processor elements other than the corresponding processor element. The interruption control device also includes an interruption request controller.

Each of the interruption request registers includes at least one interruption request bit corresponding to each of the processor elements other than the processor element corresponding to the interruption request register. Each interruption request bit can be set by a corresponding processor element to indicate the occurrence of an interruption request from the corresponding processor element.

The interruption request controller is responsive to the setting of an interruption request bit of an interruption request register. The interruption request controller in response to the setting of an interruption request bit, outputs an interruption request to a processor element corresponding to the interruption request register to which the interruption request bit which is set belongs via an interruption request line.

A second embodiment of the present invention provides an interruption control device for use in a multiprocessor system having a plurality of interconnected processor elements and a plurality of peripheral devices such as I/O devices. The interruption control device is connected to each of the processor elements by first interruption request lines and to each of the peripheral devices by second interruption request lines. The second embodiment of the present invention provides for the control of interruption requests between processor elements and between processor elements and peripheral devices.

The interruption control device of the second embodiment of the present invention includes an interruption control register having a plurality of interruption request registers corresponding to the plurality of the processor elements. Each of the interruption request registers is capable of permitting read access from at least the processor element corresponding to the interruption request register and write access from at least processor elements other than the corresponding processor element.

A plurality of interruption enable registers are provided in the interruption control register corresponding to the interruption request registers. Each interruption enable register is capable of permitting write access from at least the processor element corresponding to the interruption request and enable registers.

Further, the interruption control device of the second embodiment of the present invention includes an interruption request controller.

Each interruption request register includes a plurality of first interruption request bits corresponding to at least processor elements other than the processor element corresponding to the interruption request register and a plurality of second interruption request bits corresponding to the plurality of peripheral devices. Each first interruption request bit can be set by a corresponding processor element. Each second interruption request bit can be set by bit setting means in response to generation of an interruption request from a corresponding peripheral device. The setting of an interruption request bit indicates the occurrence of an interruption request from a corresponding processor element or peripheral device.

Each interruption enable register includes a plurality of first interruption enable bits corresponding to the first interruption request bits and a plurality of second interruption enable bits corresponding to the second interruption request bits of a corresponding interruption request register. Each of the interruption enable bits can be set by a processor element corresponding to the interruption request and enable registers to indicate the authorization of an interruption request indicated by the corresponding interruption request bit of the corresponding interruption request register.

The interruption request controller is responsive to the setting of an interruption request bit and an interruption enable bit. The interruption request controller in response to the setting of the interruption request bit and the interruption enable bit outputs an interruption request to the processor element corresponding to the interruption request register and the interruption enable register to which belongs the interruption request bit and the interruption enable bit respectively which have been set.

A third embodiment of the present invention provides an interruption control device for use with a multiprocessor system having a plurality of interconnected processor elements and a plurality of peripheral devices. The interruption control device is connected to each of the processor elements by first interruption request lines and to each of the peripheral devices by second interruption request lines. The third embodiment of the present invention provides for the control of interruption requests between processor elements and peripheral devices.

The interruption control device of the third embodiment of the present invention includes an interruption control register having a plurality of interruption request registers corresponding to the plurality of peripheral devices. Each interruption request register is capable of permitting read access from each of the processor elements.

The interruption control register also includes a plurality of interruption enable registers corresponding to the plurality of interruption request registers. Each interruption enable register is capable of permitting write access from each of the processor elements.

The interruption control device of the third embodiment of the present invention further includes an interruption request controller.

Each of the interruption request registers at least includes a plurality of interruption request bits corresponding to the plurality of processor elements each interruption request bit when set indicates the occurrence of an interruption request from a peripheral device corresponding to the interruption request register to a processor element corresponding to the interruption request bit.

Each of the interruption enable registers includes a plurality of interruption enable bits corresponding to the plurality of interruption request bits in the corresponding interruption request register. Each interruption enable bit when set by a processor element indicates the authorization for an interruption request from the peripheral device corresponding to the interruption request and enable registers to the processor element corresponding to the interruption request and enable bit.

The interruption request controller, when an interruption request is generated in a peripheral device, sets an interruption request bit corresponding to a processor element in the interruption request register corresponding to the peripheral device. The interruption request controller in response to the setting of an interruption request bit outputs an interruption request to the processor element corresponding to the interruption request bit when the corresponding interruption enable bit of the corresponding interruption enable register indicates that an interruption request is authorized.

The interruption control device of the present invention can be constructed on a single semiconductor integrated circuit chip. Such a chip including the interruption control device can be inserted in any type of processor system as needed to control interruption requests thereof.

A first embodiment of the chip of the present invention has formed thereon an interruption control device including an interruption control register having a plurality of interruption request registers each permitting read access from the exterior of the interruption control device. Each of the interruption request registers includes at least one interruption request bit which can be set to indicate the occurrence of an interruption request.

Also provided in the interruption control register of the first embodiment of the chip of the present invention are a plurality of interruption enable registers corresponding to the plurality of interruption request registers. Each of the interruption enable registers are capable of permitting write access from the exterior of the interruption control device. Each interruption enable register includes at least one interruption enable bit corresponding to the at least one interruption request bit of the corresponding interruption request register. Each interruption enable bit can be set to indicate the authorization of an interruption request indicated by the corresponding interruption request bit of the corresponding interruption request register.

The interruption control device of the first embodiment of the chip of the present invention also includes an interruption controller for generating an interruption signal corresponding to an interruption request register when an interruption request bit in the interruption request register is set indicating the occurrence of an interruption request. The interruption signal is output by the interruption controller when the interruption enable bit corresponding to the interruption request bit is set indicating that an interruption request is authorized. The interruption control device of the first embodiment of the chip of the present invention further includes bit setting apparatus for setting an interruption request bit in the appropriate interruption request register in response to an input signal.

A second embodiment of the chip of the present invention has formed thereon an interruption control device including an interruption control register having a plurality of interruption request registers each being capable of permitting at least read access from the exterior of the interruption control device. Each of the interruption request registers includes at least one interruption request bit which can be set to indicate the occurrence of an interruption request.

The interruption control register also includes a plurality of interruption enable registers corresponding to the plurality of interruption request registers. Each of the interruption enable register is capable of permitting write access at least from the exterior of the interruption control device. Each interruption enable register includes at least one interruption enable bit corresponding to the at least one interruption request bit of the corresponding interruption request register. Each of the interruption enable bit can be set to indicate the authorization of an interruption request indicated by the corresponding interruption request bit of the corresponding interruption request register.

The interruption control device of the second embodiment of the chip of the present invention further includes bit setting apparatus for setting an interruption request bit in response to an input signal.

An interruption request controller is provided in the interruption control device of the second embodiment of the chip of the present invention for generating an interruption signal corresponding to an interruption request register when an interruption request bit in the interruption request register is set indicating the occurrence of an interruption request. The interruption signal is output by the interruption request controller when the interruption enable bit corresponding to the interruption request bit is set indicating that an interruption request is authorized. The chip of the second embodiment of the present invention also has formed thereon along with the interruption control device, a bus controller for controlling the bus of a processor system.

DESCRIPTION OF THE PREFERRED EMBODIMENTS

The first, second and third embodiments of the interruption control device as connected in a multiprocessor system and a first and second embodiments of the interruption control device as it is formed on a semiconductor integrated circuit chip will be described in reference to FIG. 1-8.

Figure 1:
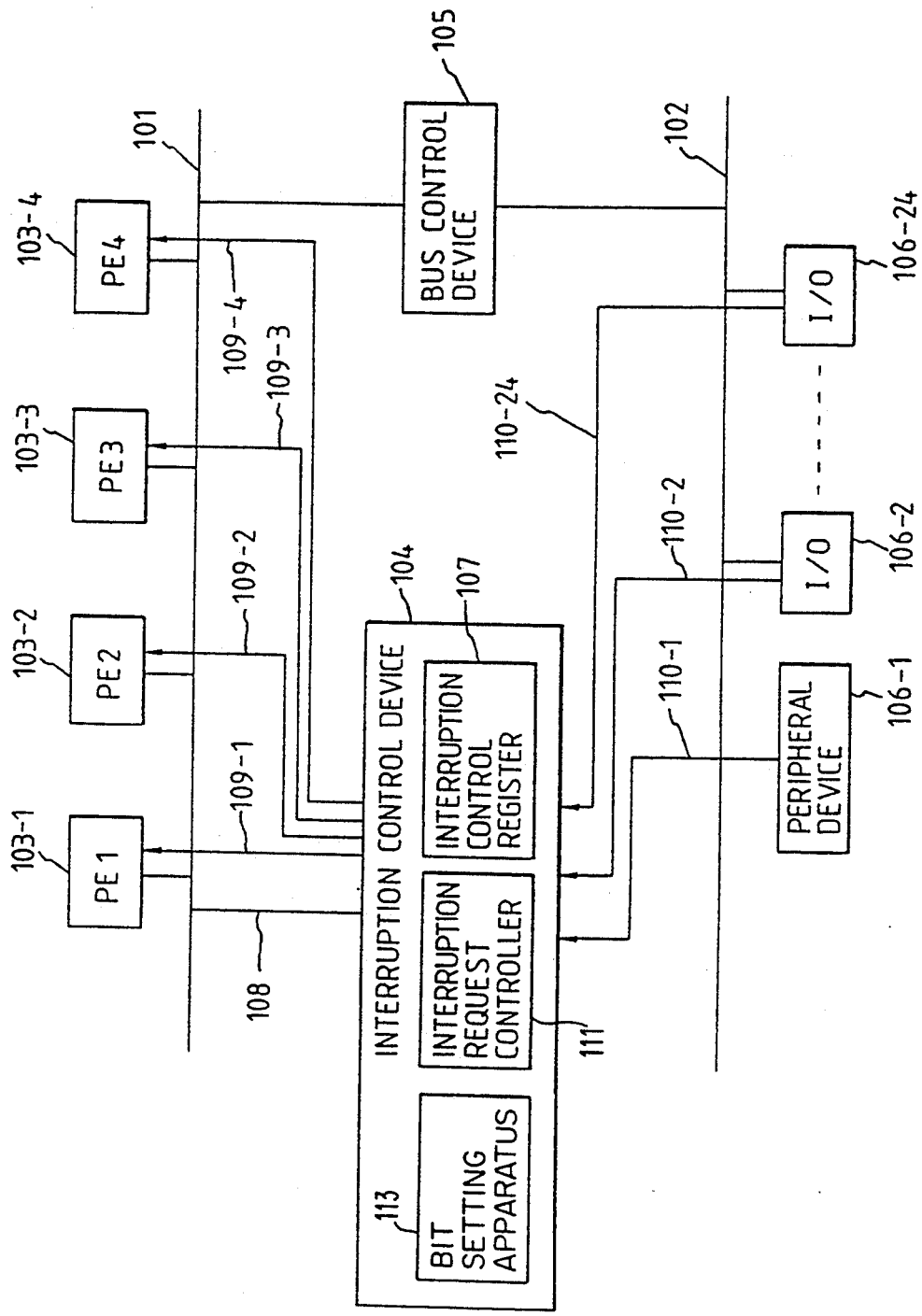
FIG. 1 is a schematic diagram showing the interruption control device as connected in the multiprocessor system of the present invention.
Figure 2:
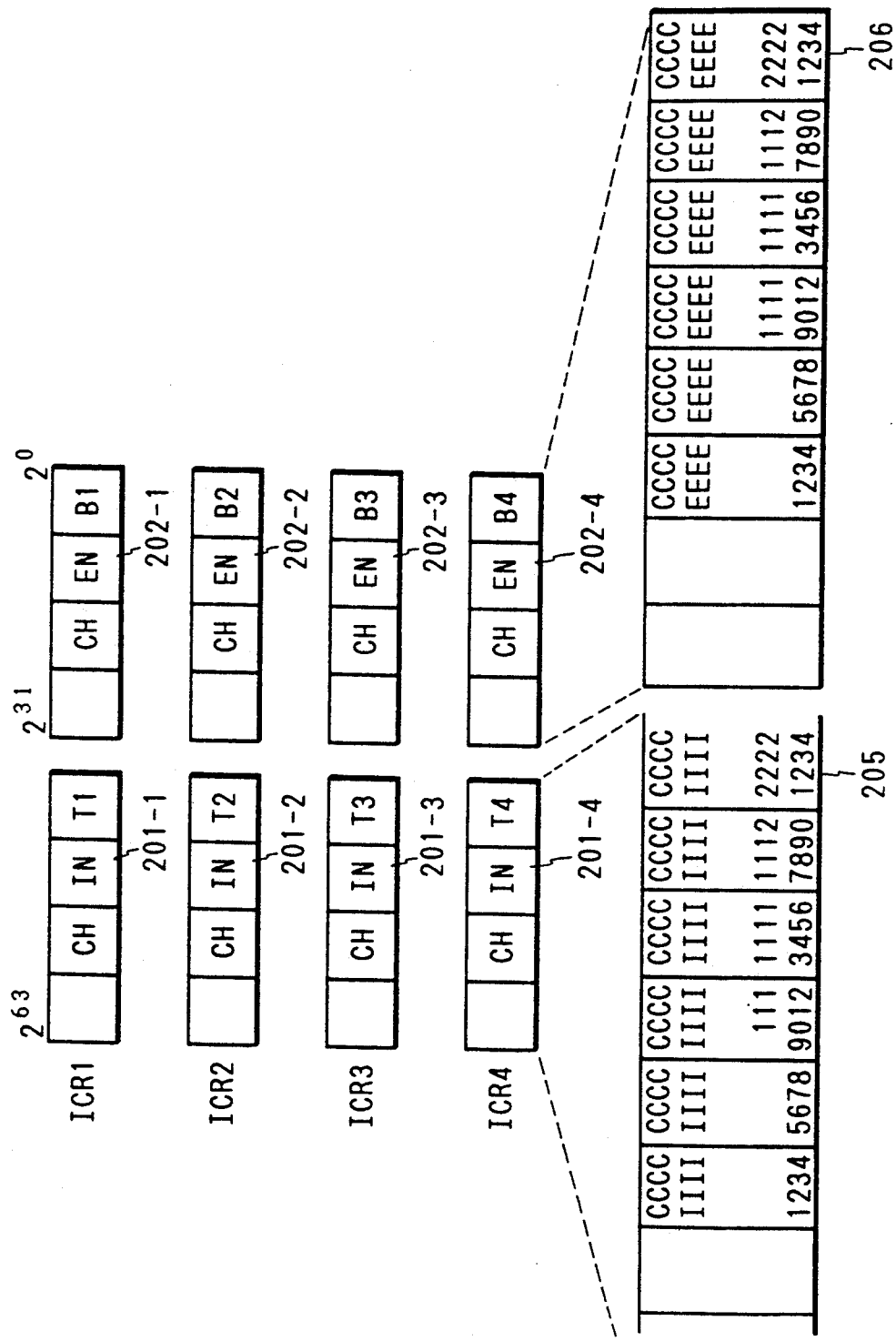
FIG. 2 is a schematic diagram of the interruption request registers and the interruption enable registers included in the interruption control device of the present invention.

The apparatus of the present invention is generally shown in FIGS. 1 and 2, wherein FIG. 1 illustrates a multiprocessor system having a plurality of processor elements 103-1 through 103-4. The processor elements 103-1 through 103-4 are interconnected by a first bus 101. A plurality of peripheral devices 106-1 through 106-24 are also provided wherein some of the peripheral devices 106-2 through 106-24 may be I/O devices. An interruption control device 104 for controlling interruption requests in the multiprocessor system is also provided. The interruption control device 104 is connected to each of the processor elements 103 by first interruption request lines 109-1 through 109-4. The interruption control device 104 is also connected to each of the peripheral devices 106 by second interruption request lines 110-1 through 110-24. The peripheral devices are interconnected by a second bus 102. A bus control device 105 is connected between the first bus 101 and the second bus 102 in order to control the operations thereof. The interruption control device 104 controls the first bus 101 by way of bus connector 108.

The interruption control device 104 includes an interruption request controller 111 for controlling interruption requests and an interruption control register 107 for holding information regarding interruption requests. Details of the interruption control register 107 are shown generally in FIG. 2 as having interruption request registers CHINT1-4 and corresponding interruption enable registers CHENB1-4. The interruption request bits 201 included in each of the interruption requests registers CHINT are illustrated as bits CI1-24 by element 205 and the interruption enable bits 202 included in each of the interruption enable registers CHENB is illustrated as bits CE1-24 by element 206. Bit setting apparatus 113 is provided for setting interruption request bits CI1-24 when an interruption request is generated by the peripheral device 106-1 through 106-24.

A first embodiment of the present invention provides the an interruption control device 104 which operates in a multiprocessor system as shown in FIG. 1 having the plurality of interconnected processor elements 103-1 through 103-4. The first embodiment of the present invention provides for the control of interruption requests between processor elements.

Figure 4:
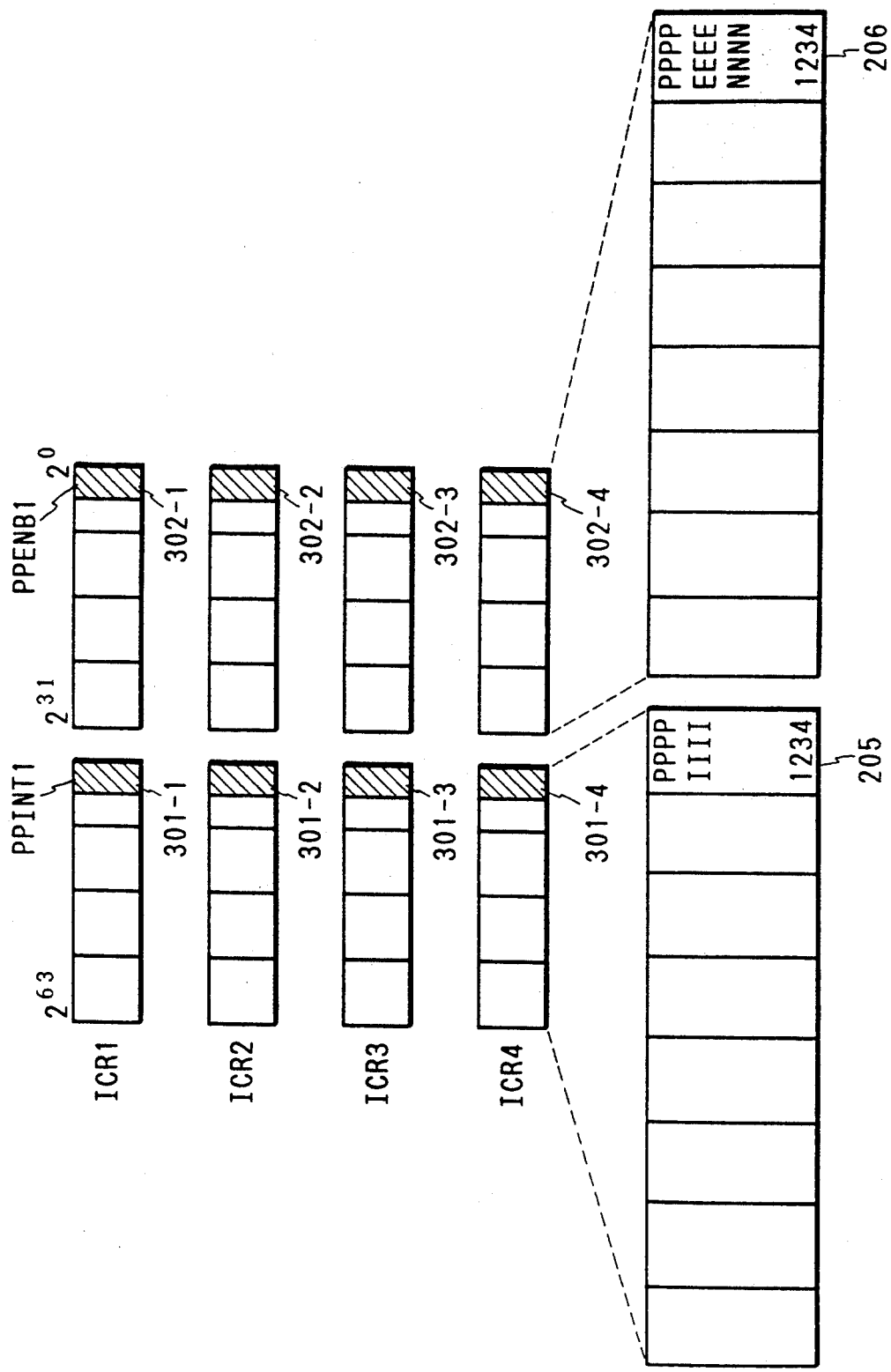
FIG. 4 is a schematic diagram of the interruption request registers and the interruption enable registers for controlling interruption requests between processor elements.

The interruption control device 104 of the first embodiment includes the interruption control register 107 having a plurality of interruption requests registers PPINT1-4 as shown in FIG. 4 corresponding to the plurality of processor elements 103-1 through 103-4. Each interruption request register PPINT is capable of permitting read access from a corresponding processor element 103 and write access from at least one of the processor elements 103 other than the corresponding processor element 103. The interruption control device 104 of the first embodiment also includes the interruption request controller 111, the operation of which will be described below.

Each of the interruption request registers PPINT includes a plurality of interruption request bits PI1-PI4 corresponding to the processor elements 103-1 through 103-4. Each interruption request bit PI can be set by a corresponding processor element 103 to indicate the occurrence of an interruption request from the corresponding processor element 103.

The interruption request controller 111 is responsive to the setting of an interrupt request bit PI of an interruption request register PPINT. The setting of an interruption request bit PI in an interruption request register PPINT is performed by a write access from a processor element 103 to a specific interruption request register PPINT corresponding to a processor element 103 to which the interrupt request is directed.

For example, as shown in FIG. 1 in order for a processor element 103-4 to request an interrupt in processor element 103-1, processor element 103-4 performs a write access of interruption request register PPINT1 corresponding to processor element 103-1. During the write access, processor element 103-4 sets interruption request bit PI4 corresponding to processor element 103-4 in interruption request register PPINT1.

The interruption request controller 111 in response to the setting of the interruption request bit PI4 in the interruption request register PPINT1 requests an interruption of processor element 103-1.

In the first embodiment of the present invention the source of the interruption request can be determined, in the above example, by having processor element 103-1 perform a read access operation on the interruption request register PPINT1. The read access operation performed by the processor element 103-1 causes the processor element 103-1 to determine that interruption request bit PI4 in the interruption request register PPINT1 has been set thereby indicating the source of the interruption request as processor element 103-4.

In the first embodiment of the present invention a plurality of interruption enable registers PPENB1-4 corresponding to the interruption request registers PPINT1-4 can be provided in the interruption control register 107 of the interruption control device 104 so as to mask the occurrence of an interrupt in a processor element 103. This feature is useful so as not to interrupt an important operation being performed by a processor element 103.

Each interruption enable register PPENB includes a plurality of interruption enable bits PEN1-PEN4 corresponding to the processor elements 103-1 through 103-4. Each interruption enable bit PEN can be set by a corresponding processor element 103 to indicate the authorization of an interruption request indicated by the corresponding interruption request bit PI of the interruption request register PPINT corresponding to the interruption enable register PPENB to which the interruption enable bit PEN belongs.

Thus, in the first embodiment of the present invention when interruption enable registers PPENB1-4 are provided the interruption request controller 111 is responsive to the setting of an interruption request bit PI and an interruption enable bit PEN. The interruption request controller 111 in the first embodiment of the present invention in response to the setting of the interruption request bit PI and the corresponding interruption enable bit PEN outputs an interruption request to the processor element 103 corresponding to the interruption request register PPINT and the interruption enable register PPENB to which belongs the interruption request bit PI and the interruption enable bit PEN respectively via first interruption request line 109.

Figure 6:
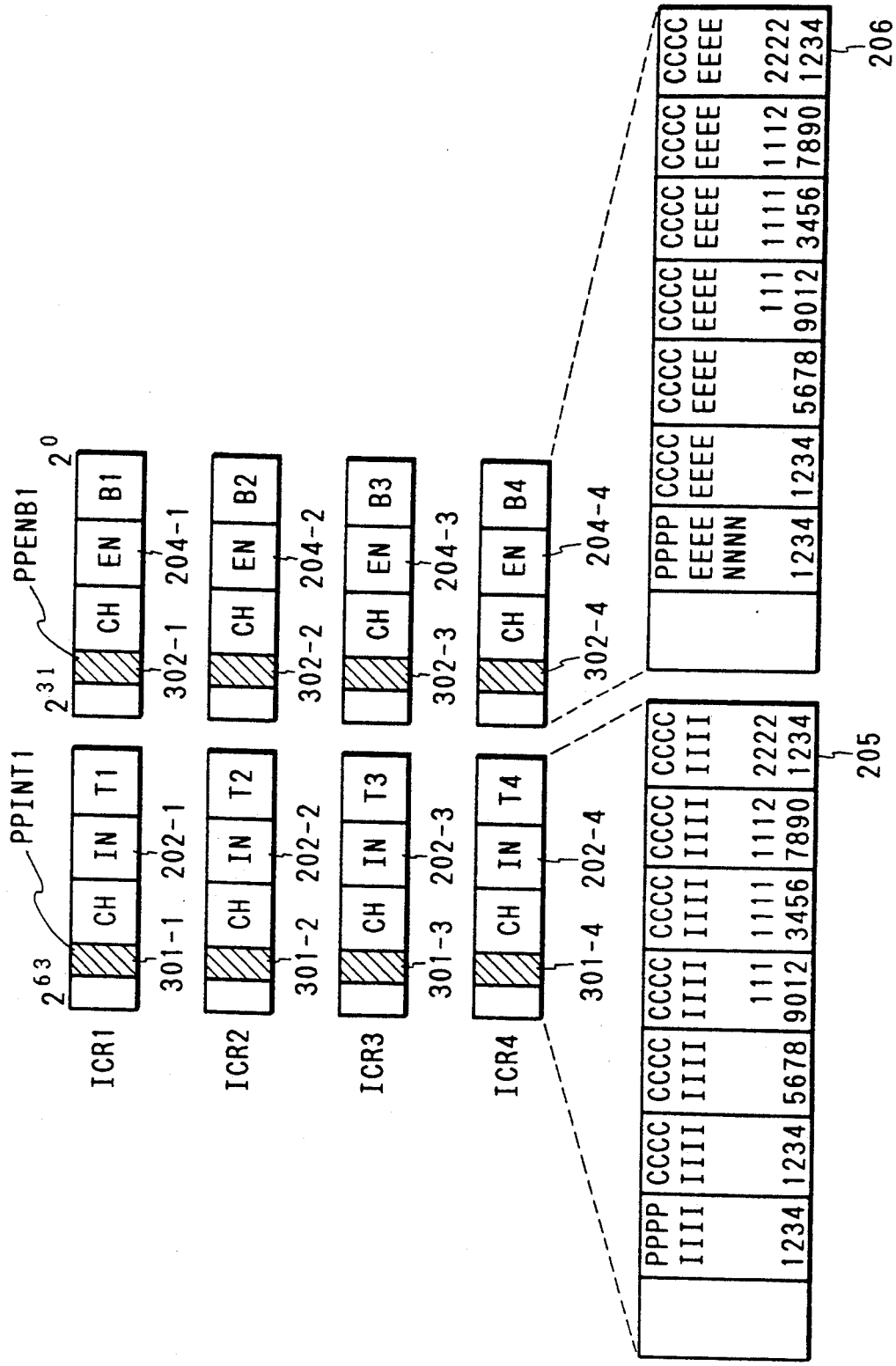
FIG. 6 is a schematic diagram of the interruption request registers and the interruption enable registers for controlling interruption requests between processor elements and between processor elements and peripheral devices.
Figure 7:
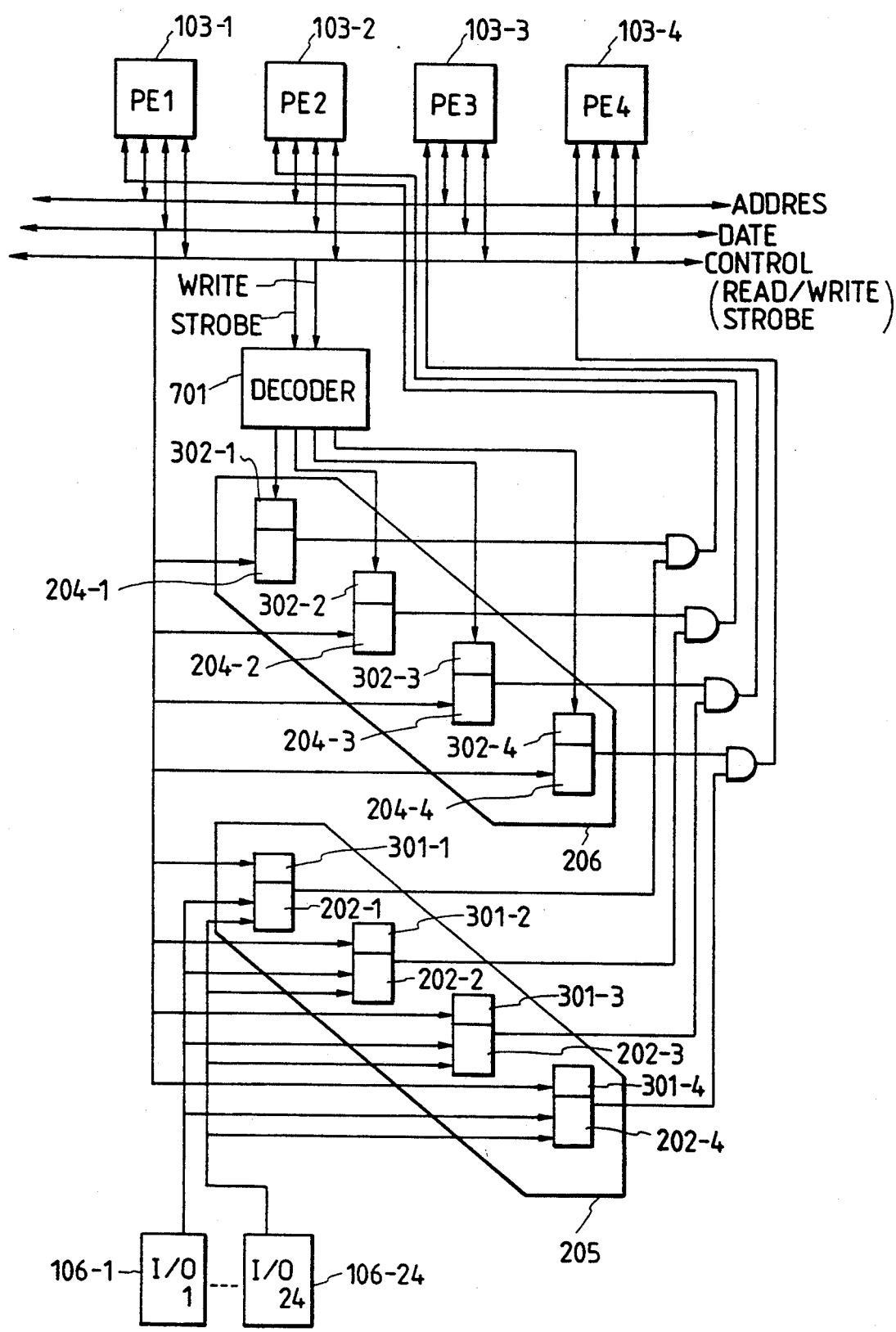
FIG. 7 is a schematic diagram showing the details of the interruption control device connected in a multiprocessor system.

A second embodiment of the present invention provides the interruption control device 104 for use in a multiprocessor system having the plurality of interconnected processor elements 103 and the plurality of peripheral devices 106-1 through 106-24 as shown in FIGS. 1, 6 and 7. The second embodiment of the present invention provides for the control of interruption requests between processor elements and between processor elements an peripheral devices.

The interruption control device 104 of the second embodiment includes the interruption control register 107 having a plurality of interruption request registers PPINT1-4/CHINT1-4 corresponding to the plurality of processor elements 103-1 through 103-4 and a plurality of interruption enable registers PPENB1-4/CHENB1-4 corresponding to the plurality interruption request registers PPINT1-4/CHINT1-4 as shown in FIG. 6. The interruption control device of the second embodiment also includes the interruption request controller 111 and the bit setting apparatus 113.

Each interruption request register PPINT/CHINT is capable of permitting read access from at least the corresponding processor element 103 and write access from at least one of the processor elements 103 other than the corresponding processor element 103.

Each interruption request register PPINT/CHINT includes a plurality of first interruption request bits 01-1 through 301-4 represented as PI1-PI4 corresponding to the processor elements 103-1 through 103-4 and a plurality of second interruption request bits 202-1 through 202-4 as represented by CI1-24 corresponding to the peripheral devices 106-1 through 106-24. Each first interruption request bit PI can be set by a corresponding processor element 103. Each second interruption request CI can be set by the bit setting apparatus 113 in response to generation of an interruption request from a corresponding peripheral device. The setting of an interruption request bit PI/CI indicates the occurrence of an interruption request from the corresponding processor element 103 or the peripheral device 106.

Each interruption enable register PPENB/CHENB is capable of permitting write access from at least the processor element corresponding to the interruption request register PPINT/CHINT and PPENB/CHENB.

Each interruption enable register PPENB/CHENB includes a plurality of first interruption enable bits 302-1 through 302-4 represented as PEN1-PEN4 corresponding to the plurality of first interruption request bits PI1-4 and a plurality of second interruption enable bits 204-1 through 204-2 represented as CE1-CE24 corresponding to the second interruption request bits CI1-CI24. Each interruption enable bits PEN/CE can be set by a write access from a the corresponding processor element 103 to indicate the authorization of an interruption request indicated by the corresponding interruption request bit PI/CI of the interruption request register PPINT/CHINT. Thus, by use of the interruption enable bits PEN1-CE24 in each of the interruption enable registers PPENB/CHENB the occurrence of an interruption request can be masked so that the corresponding processor element 103 can continue performing an important operation which should not be interrupted.

The interruption request controller 111 is responsive to the setting of an interruption request bit PI1-CI24 and the setting of an interruption enable bit -PEN1-CE24 in an interruption request register PPINT/CHINT and an interruption enable register PENB/CHENB respectively. The interruption request controller 111 in response to the setting of an interruption request bit PI1-CI24 and the setting of an interruption enable bit PEN1-CE24 outputs an interruption request to the processor element 103 corresponding to the interruption request register PPINT/CHINT and the interruption enable register PPENB/CHENB to which belongs the interruption request bit PI1-CI24 and the interruption enable bit PEN1-CE24 respectively.

The interruption request controller 111 ca operate by ANDing the interruption request bit PI1-CI24 and the interruption enable bit PEN1-CE24 to determine whether an interruption request is to be output.

The second embodiment of the present invention operates very similar to that described above with respect to the first embodiment in that each interruption enable bit PE/CE of the interruption enable registers PPENB1-4/CHENB1-4 indicates whether an interruption request is authorized for the corresponding processor element 103 and that each interruption request bit PI/CI of the interruption request registers PPINT1-4/CHINT1-4 indicates that an interruption request from either a processor element 103 or a peripheral device 106 has occurred. The interruption request controller 111 in response to the setting of a interruption request bit PI1-CI24 corresponding to either a processor element 103 or a peripheral device 106 and the setting of an interruption enable bit PEN1-CE24 corresponding to the interruption request bit PI1-CI24 outputs an interruption request to the processor element 103 corresponding to the interruption request register PPINT/CHINT and the interruption enable register PPENB/CHENB to which the interruption request bit PI1-CI24 and the interruption enable bit PEN1-CE24 respectively belong.

In the second embodiment of the present invention a processor element 103 to which an interruption request has been output can determine the source of the interruption request by performing a read access operation of the corresponding interruption request register PPINT/CHINT which indicates, by the setting of an interruption request bit PI/CI therein, which one of the processor elements 103 or peripheral devices 106 is the source of the interruption request.

Figure 5:
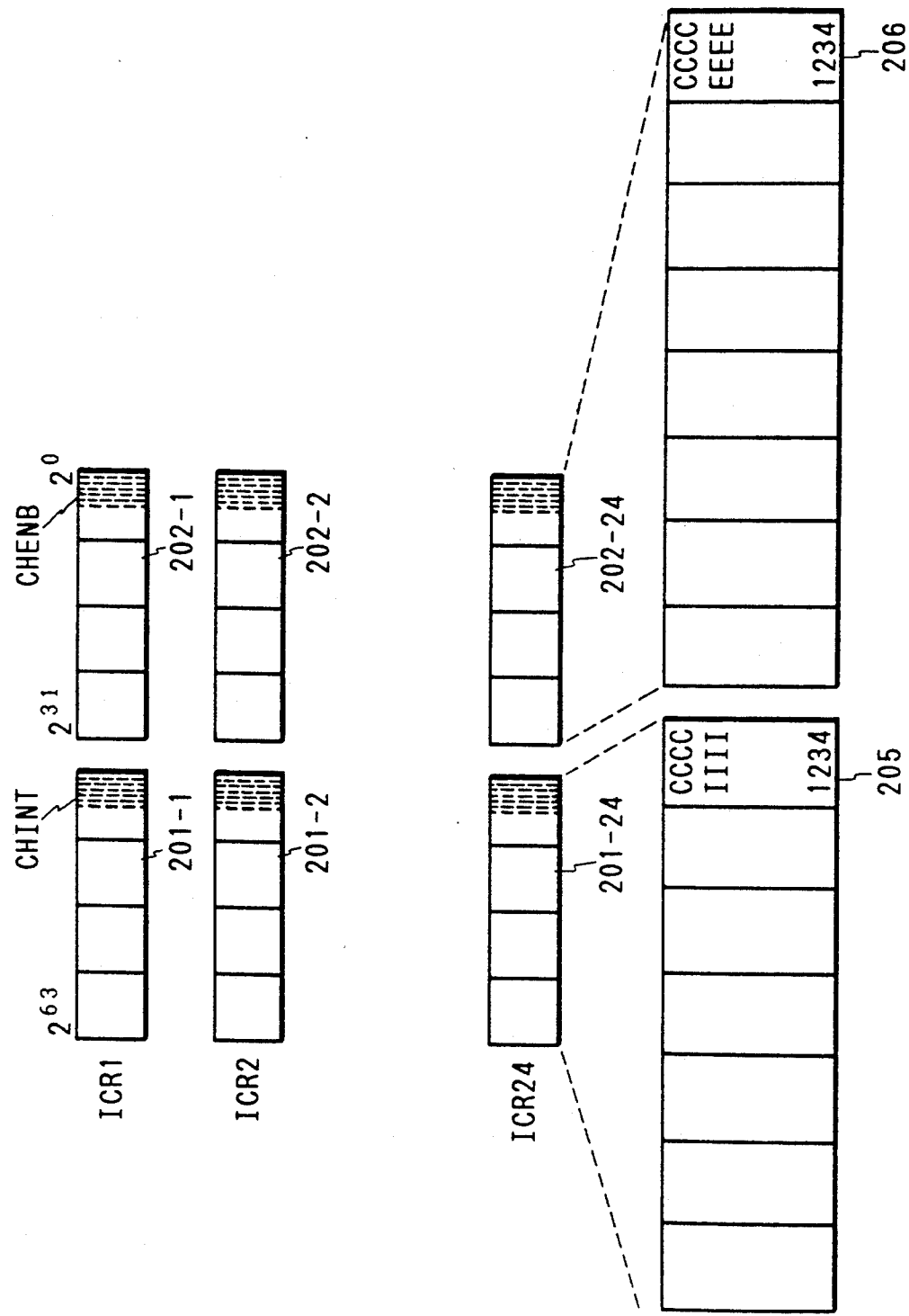
FIG. 5 is a schematic diagram of the interruption request registers and the interruption enable registers for controlling interruption requests between processor elements and peripheral devices.

A third embodiment of the present invention provides the interruption control device 104 having a plurality of interconnected processor elements 103-1 through 103-4 and a plurality of peripheral devices 106-1 through 106-24 as shown in FIGS. 1 and 5. The third embodiment of the present invention provides for the control of interruption request between processor elements and peripheral devices.

The interruption control device 104 of the third embodiment includes the interruption control register 107 having a plurality of interruption request registers CHINT1-14 corresponding to the plurality of peripheral devices 106-1 through 106-24 and a plurality of interruption enable registers CHENB1-14 corresponding to the plurality of interruption request registers CHINT1-24 as shown in FIG. 5.

Each interruption request register CHINT is capable of permitting read access from each of the plurality of processor elements 103-1 through 103-4. Each interruption request register CHINT includes a plurality of interruption request bits 201 represented as CI when set corresponding to the plurality of processor elements 103-1 through 103-4. Each interruption request bit CI1-CI4 indicates the occurrence of an interruption request from the peripheral device 106 corresponding to the interruption request register CHINT to which the interruption request bit CI1-CI4 belongs to the process element 103 corresponding to the interruption request bit CI.

Each interruption enable register CHENB is capable of permitting write access from each of the plurality of processor elements 103. Each of the interruption enable registers includes a plurality of interruption enable bits 202 represented as CE1-CE4 corresponding to the plurality of interruption request bits CI1-CI4 in the corresponding interruption request register CHINT. Each interruption enable bit CE when set by a corresponding processor element 103 indicates the authorization for an interruption request from the peripheral device 106 corresponding to the interruption request and enable registers CHINT and CHENB to the processor element 103 corresponding to the interruption request and enable bits CI and CE.

The interruption request controller 111, when an interruption request to processor element 103 is generated in a peripheral device 106, sets an interruption request bit CI corresponding to the processor element 103 in the interruption request register CHINT corresponding to the peripheral device 106. If the interruption enable bit CE corresponding to the interruption request bit CI is also set by way of a write operation from the corresponding processor element 103, then the interruption request controller 100 outputs an interruption request to the processor element 103 corresponding to the interruption request bit CI and the interruption enable bit CE of the interruption request register CHINT and the interruption enable register CHENB respectively.

Figure 3:
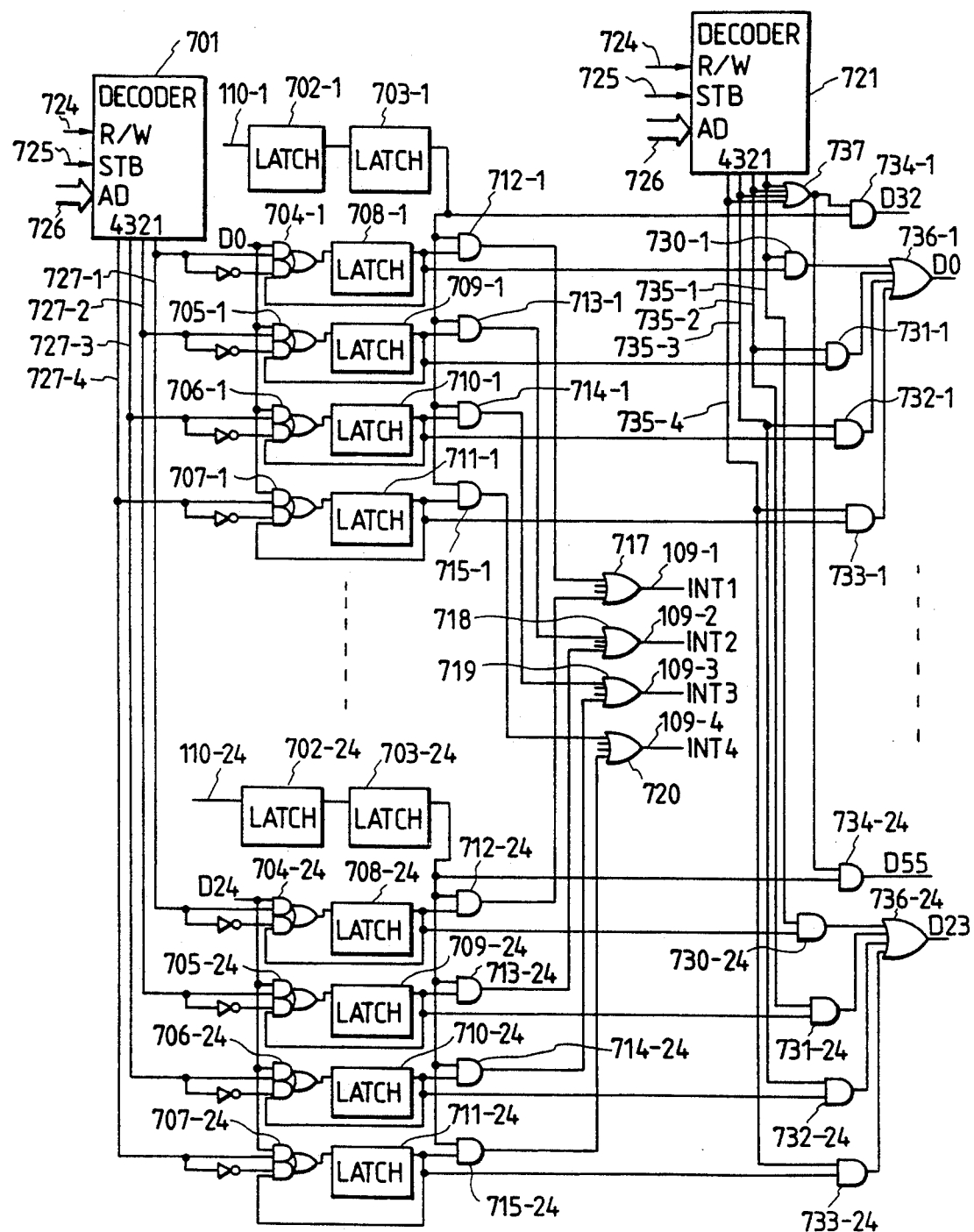
FIG. 3 is a detailed schematic diagram of the interruption control device of the present invention.

FIG. 3 of the present application illustrates in more detail the elements included within the interruption control device 104 of the present invention.

The interruption control device 104 includes a write decoder 701 which decodes a read/write signal 724, a strobe signal 724 and an address 726 and outputs load timing signals 727-1 through 727-4 which are provided to latches 708, 709, 710, and 711. When a write access operation is conducted by write decoder 701 data on lines D8-D24 is set to latches 708, 709, 710 and 711 through selectors 704, 705, 706 and 707. Latches 703-1 through 703-24 correspond to the interruption request registers CHINT1-4 as shown in FIG. 2 of the present application. Since the state of the data in latches 703-1 through 703-24 is the same for each of the interruption request register, latches 703-1 through 703-24 are shown in FIG. 3 as being connected with each group of latches 708, 709, 710 and 711.

Latches 708-1 through 708-24 correspond to interruption enable register CHENB1, latches 709-1 through 709-24 correspond to interruption enable register CHENB2, latches 710-1 through 710-24 correspond to interruption enable register CHENB3 and latches 711-1 through 711-24 correspond to interruption enable register CHENB4.

Interruption requests from the peripheral devices 106-1 through 106-24 are provided by second interruption request lines 110-1 through 110-24 to latches 702-1 through 702-24 respectively. The interruption requests are synchronized with internal signals in the latches 702-1 through 702-24 and set in the latches 703-1 through 703-24.

To determine whether an interruption request can be output to a processor element 103 by first interruption request lines 109-1 through 190-4, each of the latches 703-1 through 703-24 and each of the latches 708-1 through 711-24 are ANDed together by AND gates 712-1 through 715-24. If, for example, a bit in latch 703 is st indicating the occurrence of an interruption request from a corresponding peripheral device 106 and a bit in latch 708 corresponding to the bit in latch 703 is set indicating that an interruption request is enabled (authorized, unmasked, etc.), then one of the outputs from AND gates 712-1 through 712-24 is set causing OR gate 717 to output an interruption request on first interruption line 109-1 to processor element 103-1.

Outputs from the AND gates 713-1 through 715-24 are provided to the OR gates 718 through 720 which outputs an interruption request on first interruption request lines 109-2 through 109-4 when one of the bits of the lathes 703-1 through 703-24 indicates the occurrence of an interruption request from one of the peripheral devices 106 and one of the bits of latches 709-1 through 711-24 is set indicating that an interruption request is authorized for the corresponding processor element 103.

Data of the interruption enable registers CHENB1-4 corresponding respectively to latches 708-1-24, 709-1-24, 710-1-24 and 711-1-24 are output from OR gates 736-1-24 through AND gates 730-1-24, 731-1-24, 732-1-24 and 733-1-24 when a read access operation is performed through read decoder 721. A read access operation from decoder 721 also causes data in the interruption request registers CHINT1-4 corresponding respectively to latches 703-1-24 to be output through AND gates 734-1-24 which is opened by the output from OR gate 737.

Figure 8:
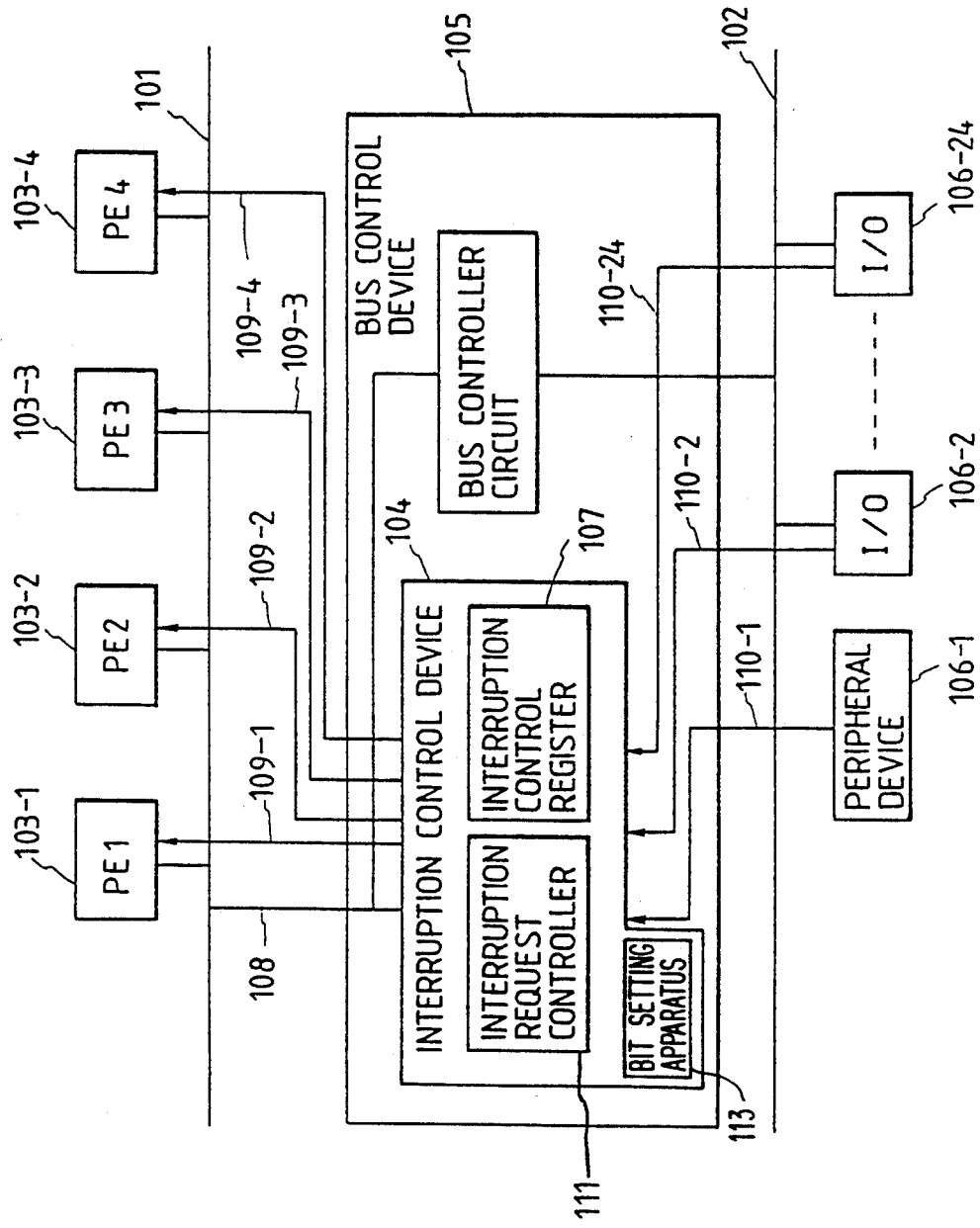
FIG. 8 is a schematic diagram showing the interruption control device and the bus controller circuit being formed on a single semiconductor integrated circuit chip.

FIG. 8 generally discloses a first and second embodiment of a semiconductor integrated circuit chip 112 having formed thereon the interruption control device 104 and a bus controller circuit 501 which controls the first and second buses 101 and 102 respectively. The bus controller 501 is connected to bus connector 108 and to the second bus 102. All the other elements of the multiprocessor system are connected in the same manner as that shown in FIG. 1 and have the same function.

The interruption control device 104 being formed on the single integrated circuit chip 112 permits the chip 112 to be inserted in any type of processor system to control interruption requests thereof.

A first embodiment of the chip 112 provides for the interruption control device 104 formed on the chip 112 provides for having the interruption control register 107. The interruption control register 107 includes a plurality of interruption request registers CHINT1-4 as shown, for example, in FIG. 2 each permitting read access from the exterior of the interruption control device 104. Each of the interruption request registers CHINT includes at least one interruption request bit 201 represented as CI1-24 for indicating when set the occurrence of an interruption request.

Also provided in the interruption control register 107 are a plurality of interruption enable registers CHENB1-4 corresponding to the plurality of interruption request registers CHINT1-4. Each interruption enable registers CHENB is capable of permitting write access from the exterior of the interruption control device 104. Each interruption enable register CHENB includes at least one interruption enable bit 202 represented as CE1-24 corresponding to the at least one interruption request bit CI-24 201 of the corresponding interruption request register CHINT. Each interruption enable bit CE indicates when set the authorization of an interruption request indicated by the corresponding interruption request bit CI of the corresponding interruption request register CHINT.

The interruption control device 104 also includes the interruption controller 111 for outputting an interruption signal corresponding to the interruption request register CHINT to which belongs an interruption bit CI indicating the occurrence of an interruption request. The interruption signal is output when the interruption enable bit CE corresponding to the interruption request bit CI indicates that an interruption request is authorized.

The interruption control device 104 of the first embodiment of the semiconductor integrated chip includes bit setting apparatus 113 for setting an interruption request bit CI in the appropriate interruption request register CHINT in response to an input signal provided on one of the second interruption request lines 110.

The second embodiment of the semiconductor integrated circuit chip 112 has formed thereon an interruption control device 104 having the interruption control register 107 including the plurality of interruption request registers CHINT1-4 and the plurality of corresponding interruption enable registers CHENB1-4 as shown, for example, in FIG. 2. Each interruption request register CHINT is capable of permitting at least read access from the exterior of the interruption control device 104 and each interruption request register CHINT includes a plurality of interruption request bits 201 as represented as CI1-24. Each interruption request bit CI indicates the occurrence of an interruption request.

Each interruption enable registers CHENB is capable of permitting write access at least form the exterior of the interruption control device 104. Each interruption enable register CHENB includes a plurality of interruption enable bits 202-1 represented as CE1-24. In each interruption enable register CHENB the plurality of interruption enable bits CE1-24 corresponds to the plurality of interruption request bits CI1-24 of the corresponding interruption request register CHINT. Each of the interruption enable bits CE indicates the authorization for an interruption request indicated by the corresponding interruption request bit CI of the corresponding interruption request register CHINT.

The interruption control device 104 of the second embodiment of the chip 112 includes bit setting apparatus 113 for setting an interruption request bit CI in response to an input signal provided on a second interruption request line 110.

The interruption control device 104 of the second embodiment of the chip further includes the interruption request controller 111 for outputting an interruption signal on one of the first interruption request lines 109 corresponding to the interruption request register CHINT to which belongs the interruption request bit CI which indicates the occurrence of an interruption request. The interruption signal, however, is not output until the interruption enable bit CE, corresponding to the interruption request bit CI which has been set, indicates that an interruption request is authorized.

The semiconductor integrated circuit chip 112 of the second embodiment also has formed thereon along with the interruption control device 104 a bus controller circuit 501 for controlling the buses of a processor system.

Therefore, by use of the above described embodiments of the present invention there is provided an interruption control device for operation with a multiprocessor system having a plurality of processor elements that reduces the amount of hardware needed to effectively control interruption requests directed to the processor elements whether the interruption requests are initiated by peripheral devices or the processor elements.

Further, by use of the present invention as described above, an interruption control device is provided for use in a multiprocessor system having a plurality of processor elements for effectively controlling simultaneous and sequential interruption requests whether the interruption requests are generated by peripheral devices or the processor elements.

Still further, the present invention as described above provides an interruption control device for operation with a multiprocessor system having a plurality of processor elements wherein the interruption control device identifies the particular interruption request being initiated and the source of the interruption request whether from an peripheral device or processor element.

While the present invention has been described in terms of its preferred embodiments, it should be understood that numerous modifications may be made thereto without departing from the spirit and scope of the invention as defined in the appended claims. For example, the present invention may be used in any application which requires the identification of an interruption request and the source of the interruption request. It is intended that all such modifications fall within the scope of the appended claims.

I claim:

1. An interruption control device for controlling interruption requests between processor elements in a multiprocessor system including a plurality of interconnected processor elements, said interruption control device comprising:

a plurality of interruption request lines respectively connected to said processor elements, said interruption request lines being lines other than address lines;

an interruption control register having a plurality of interruption request registers corresponding to said processor elements, each interruption request register permits a respective processor element to read information stored therein and at least processor elements other than the receptive processor element to write information therein, each interruption request register includes a plurality of interruption request bits corresponding to said processor elements, wherein each interruption request bit can be set by a corresponding processor element to indicate an occurrence of an interruption request from said corresponding processor element to a processor element corresponding to said interruption request register; and an interruption request controller, connected to said interruption control register and said processor elements and responsive to the setting of an interruption request bit, for directly outputting an interruption request through the interruption request line to a processor element corresponding to an interruption request register when an interruption request bit in said interruption request register is set.

2. An interruption control device for controlling interruption requests between processor elements in a multiprocessor system including a plurality of interconnected processor elements wherein said interruption control device is connected to each processor element by an interruption request line, said interruption control device comprising:

an interruption control register having a plurality of interruption request registers corresponding to said processor elements, each interruption request register permits a respective processor element to write information stored therein and at least processor elements other than teh respective processor element to writ information therein, each interruption request register includes a plurality of interruption request bits corresponding to said processor elements, wherein each interruption request bit can be set by a corresponding processor element to indicate an occurrence of an interruption request from said corresponding processor element to a processor element corresponding to said interruption request register;

an interruption request controller, connected to said interruption control register and said processor elements and responsive to the setting of an interruption request bit, for directly outputting an interruption request through the interruption request line to a processor element corresponding to an interruption request register when an interruption request bit in said interruption request register is set;

a plurality of interruption enable registers, corresponding to said interruption request registers included within said interruption control register, for permitting at least a processor element corresponding to said corresponding interruption request register to write information therein;

wherein each interruption enable register includes a plurality of interruption enable bits corresponding to said plurality of interruption request bits of said corresponding interruption request register;

wherein each interruption enable bit can be set by a corresponding processor element to indicate an authorization of an interruption request indicated by a corresponding interruption request bit of said corresponding interruption request register; and wherein said interruption request controller, responsive to the setting of an interruption request bit and an interruption enable bit, outputs an interruption request to a processor element corresponding to said interruption request register and said interruption enable register to which said interruption request bit and said interruption enable bit belong respectively, when said interruption enable bit has been set.

3. An interruption control device according to claim 2, wherein said multiprocessor system includes a plurality of peripheral devices each being connected to said interruption control device by second interruption request lines;

wherein each interruption request register includes a plurality of second interruption request bits corresponding to said peripheral devices;

wherein each second interruption request bit can be set by bit setting means to indicate occurrence of an interruption request from a corresponding peripheral device;

wherein each interruption enable register includes a plurality of second interruption enable bits corresponding to said second interruption request bits of said corresponding interruption request register;

wherein each interruption enable bit can be set by a corresponding processor element to indicate an authorization of an interruption request indicated by a corresponding interruption request bit of said corresponding interruption request register; and said interruption request controller, responsive to the setting of an interruption request bit and an interruption enable bit, outputs an interruption request to a processor element corresponding to said interruption request register and said interruption enable register to which said interruption request bit and said interruption enable bit belong respectively, when said interruption enable bit is set.

4. An interruption control device for controlling interruption requests between processor elements and peripheral devices in a multiprocessor system including a plurality of interconnected processor elements and a plurality of peripheral devices, comprising:

a plurality of first interruption request lines for respectively connecting the interruption control device to each of the processor elements;

a plurality of second interruption request lines for respectively connecting the interruption control device to each of the peripheral devices;

an interruption control register having a plurality of interruption request registers corresponding to said peripheral devices, each interruption request register permits each of said processor elements to read information stored therein, and a plurality of interruption enable registers corresponding to said interruption request registers, each interruption request register permits each of said processor elements to write information therein;

wherein each interruption request register includes a plurality of interruption request bits corresponding to said processor elements, each interruption request bit can be set to indicate an occurrence of an interruption request from a peripheral device corresponding to said interruption request register to a processor element corresponding to said interruption request bit;

wherein each interruption enable register includes a plurality of interruption enable bits corresponding to said plurality of interruption request bits in a corresponding interruption request register, each interruption enable bit can be set by a corresponding processor element to indicate authorization for an interruption request from a peripheral device corresponding to said corresponding interruption request register to a processor element corresponding to a corresponding interruption request bit; and an interruption request controller, connected to said interruption control register, said processor elements and said peripheral devices, for settling an interruption request bit in an interruption request register in response to an interruption request generated by a peripheral device corresponding to said interruption request register and directly outputting, through a first interruption request line, an interruption request to a processor element corresponding to said interruption request bit which has been set, when said corresponding interruption enable bit indicates that an interruption request is authorized.

5. An interruption control device for controlling interruption requests between apparatuses exterior of said interruption control device comprising:

a plurality of interruption request registers each permitting apparatus exterior of said interruption control device to read information stored therein, each interruption request register having a plurality of interruption request bits for indicating when set by said exterior apparatuses an occurrence of an interruption request from corresponding exterior apparatuses;

a plurality of interruption enable registers corresponding to said interruption request registers, each interruption enable register permits apparatus exterior of said interruption control device to write information therein, each interruption enable register includes a plurality of interruption enable bits corresponding to interruption request bits of a corresponding interruption request register, each interruption enable bit indicating when set an authorization for an interruption request indicated by a corresponding interruption request bit of said corresponding request register; and interruption means, connected to said interruption request registers, interruption enable registers and said exterior apparatuses and responsive to the setting of an interruption request bit and an interruption enable bit, for outputting an interruption request corresponding to an interruption request register and an interruption enable register to which said interruption request bit and said interruption enable bit belong respectively, when said interruption enable bit is set.

6. An interruption control device according to claim 5, further comprising:

bit setting means for setting an interruption request bit corresponding to an input signal.

7. An interruption control device according to claims 6 wherein said interruption control device is formed on a single semiconductor integrated circuit chip.

8. An interruption control device according to claims 5 wherein said interruption control device is formed on a single semiconductor integrated circuit chip.

9. An interruption control device according to claim 8 further comprising:

a bus control device, being formed on said chip with said interruption control device for controlling a bus.

10. An interruption control device according to claim 5 further comprising:

an interruption control register including said plurality of interruption request registers and said plurality of interruption enable registers; and bit setting apparatus for setting an interruption request bit in an interruption request register in response to an input signal.

11. An interruption control device according to claim 10 further comprising:

a bus controller for controlling a bus formed on said chip along with said interruption control device.

12. A multiprocessor system comprising:

a plurality of processor elements; and an interruption control device for controlling interruption requests between processor elements in said multiprocessor system;

said interruption control device having an interruption request means and a plurality of interruption request registers corresponding to said processor elements, said interruption request means being respectively connected to said processor elements by interruption request lines, said interruption request means being connected to said interruption request registers, said interruption request lines being lines other than address lines;

wherein each interruption request register permits a corresponding processor element to read information stored therein and at lest processor elements other than said corresponding processor element to write information therein;

wherein each interruption request register includes a plurality of interruption request bits for being set to indicate the occurrence of an interruption request from a respective processor element; and wherein said interruption request means, being responsive to the setting of an interruption request bit of an interruption request register, directly outputs through an interruption request line an interruption request to a processor element corresponding to an interruption request register to which belongs said interruption request bit which has been set.

13. A multiprocessor system comprising:

a plurality of processor elements; and an interruption control device for controlling interruption requests between processor elements in said multiprocessor system;

said interruption control device having an interruption request means and a plurality of interruption request registers corresponding to said processor elements, said interruption request means being respectively connected to said processor elements by interruption request lines, said interruption request means being connected to said interruption request registers;

wherein each interruption request register permits a corresponding processor element to read information stored therein and at least processor elements other than said corresponding processor element to write information therein;

wherein each interruption request register includes a plurality of interruption request bits for being set to indicate the occurrence of an interruption request from a respective processor element; and wherein said interruption request means, being responsive to the setting of an interruption request bit of an interruption request register, directly outputs through an interruption request line an interruption request to a processor element corresponding to an interruption request register to which belongs said interruption request bit which has been set;

a plurality of interruption enable registers corresponding to said interruption request registers, said interruption enable registers being included in said interruption control device;

wherein each interruption enable register permits a corresponding processor element to write information therein;

wherein each interruption enable register includes a plurality of interruption enable bits corresponding to said plurality of interruption request bits of a corresponding interruption request register, each interruption enable bit when set indicates an authorization for an interruption request indicated by a corresponding interruption request bit of a corresponding interruption request register; and wherein said interruption request means, responsive to the settling of an interruption request bit and an interruption enable bit, outputs an interruption request to a processor element corresponding to an interruption request register and an interruption enable register to which said interruption request bit and said interruption enable bit belong respectively, when said interruption enable bit is set.

14. A multiprocessor system according to claim 13 further comprising:

a plurality of peripheral devices;

wherein said each interruption request register includes a plurality of second interruption request bits corresponding to said peripheral devices, each second interruption request bit indicating when set an occurrence of an interruption request from a corresponding peripheral device;

said each interruption enable register including a plurality of second interruption enable bits corresponding to said second interruption request bits, each interruption enable bit when set indicating the authorization of an interruption request indicated by a corresponding interruption request bit of a corresponding interruption request register; and said interruption request means being provided for setting an interruption request bit corresponding to a processor element or a peripheral device in an interruption request register upon occurrence of an interruption request generated by said processor element or peripheral device and outputting an interruption request to a processor element corresponding to said interruption request register when an interruption enable bit corresponding to said interruption request bit is set.

15. An interruption control device formed on a semiconductor integrated circuit chip for controlling interruption requests between processor elements, said interruption control device comprising:

a plurality of interruption request terminals to be respectively connected to said processor elements, said interruption request terminals being terminals other than address terminals;

an interruption control register having a plurality of interruption request registers corresponding to said processor elements, each interruption request register permits a respective processor element to read information stored therein and at least processor elements other than the respective processor element to write information therein, each interruption request register includes a plurality of interruption request bits corresponding to said processor elements, wherein each interruption request bit can be set by a corresponding processor element to indicate an occurrence of an interruption request from said corresponding processor element to a processor element corresponding to aid interruption request register; and an interruption request controller, connected to said interruption control register and said processor elements and responsive to the setting of an interruption request bit, for directly outputting an interruption request through the interruption request terminal to a processor element corresponding to an interruption request register when an interruption request bit in said interruption request register is set.

16. An interruption control device formed on a semiconductor integrated circuit chip for controlling interruption requests between processor elements and peripheral devices comprising:

a plurality of first interruption request terminals to respectively connect the interruption control device to each of the processor elements and a plurality of second interruption request terminals to respectively connect the interruption control device to each of the peripheral devices;

an interruption control register having a plurality of interruption request registers corresponding to said peripheral devices, each interruption request register permits each of said processor elements to read information stored therein, and a plurality of interruption enable registers corresponding to said interruption request registers, each interruption request register permits each of said processor elements to write information therein;

wherein each interruption request register includes a plurality of interruption request bits corresponding to said processor elements, each interruption request bit can be set to indicate an occurrence of an interruption request from a peripheral device corresponding to said interruption request register to a processor element corresponding to said interruption request bit;

wherein each interruption enable register includes a plurality of interruption enable bits corresponding to said plurality of interruption request bits in a corresponding interruption request register, each interruption enable bit can be set by a corresponding processor element to indicate authorization for an interruption request form a peripheral device corresponding to said corresponding interruption request register to a processor element corresponding to a corresponding interruption request bit; and an interruption request controller, connected to said interruption control register, said processor elements and said peripheral devices, for setting an interruption request bit in an interruption request register in response to an interruption request generated by a peripheral device corresponding to said interruption request register and directly outputting, through a first interruption request terminal to a processor element corresponding to said interruption request bit which has been set, when said corresponding interruption enable bit indicates that an interruption request is authorized.

17. An interruption control device, formed on a semiconductor integrated circuit, for controlling interruption requests between apparatuses exterior of said interruption control device, comprising:

a plurality of interruption request registers each permitting apparatus exterior of said interruption control device to read information stored therein, each interruption request register having a plurality of interruption request bits for indicating when set by said exterior apparatuses an occurrence of an interruption request from corresponding exterior apparatuses;

a plurality of interruption enable registers corresponding to said interruption request registers, each interruption enable register permits apparatus exterior of said interruption control device to write information therein, each interruption enable register includes a plurality of interruption enable bits corresponding to interruption request bits of a corresponding interruption request register, each interruption enable bit indicating when set an authorization for an interruption request indicated by a corresponding interruption request bit of said corresponding request register; and interruption means, connected to said interruption request registers, interruption enable registers and said exterior apparatuses and responsive to the setting of an interruption request bit and an interruption enable bit, for outputting an interruption request corresponding to an interruption request register and an interruption enable register to which said interruption request bit and said interruption enable bit belong respectively, when said interruption enable bit is set.

* * * * *